(12) United States Patent
Ruizenaar et al.

(10) Patent No.: US 8,779,897 B2
(45) Date of Patent: Jul. 15, 2014

(54) LOCATION INFORMATION BASED UPON ELECTRONIC TAGS

(75) Inventors: Marcel Gregorius Anthonius Ruizenaar, Zoetermeer (NL); Reinder Martinus Neef, Utrecht (NL); Simon Adrianus van Merriënboer, Rotterdam (NL)

(73) Assignee: Nederlandse Organisatie voor toegepast—natuurwetenschappelijk onderzoek TNO, Delft (NL)

( * ) Notice: Subject to any disclaimer, the term of this patent is extended or adjusted under 35 U.S.C. 154(b) by 677 days.

(21) Appl. No.: 13/127,546

(22) PCT Filed: Nov. 9, 2009

(86) PCT No.: PCT/NL2009/050679
§ 371 (c)(1),
(2), (4) Date: Jul. 20, 2011

(87) PCT Pub. No.: WO2010/053371
PCT Pub. Date: May 14, 2010

(65) Prior Publication Data
US 2011/0273275 A1    Nov. 10, 2011

(30) Foreign Application Priority Data

Nov. 7, 2008 (EP) .................................. 08168654
Mar. 31, 2009 (EP) .................................. 09156977

(51) Int. Cl.
*G01S 5/02* (2010.01)

(52) U.S. Cl.
USPC .................... 340/10.1; 340/572.1; 340/572.4; 235/376; 235/385; 705/28

(58) Field of Classification Search
CPC ........................ G08B 13/2462; G01S 5/0289
USPC .......... 340/10.1, 572.1, 572.4; 235/376, 385; 705/28

See application file for complete search history.

(56) References Cited

U.S. PATENT DOCUMENTS 5,959,568 A     9/1999  Woolley
6,512,478 B1 *  1/2003  Chien ..................... 342/357.25

(Continued)

OTHER PUBLICATIONS

Jan Petzold et al: "Prediction of Indoor Movements Using Bayesian Networks" Lecture Notes in Computer Science, Springer Verlag, Berlin; DE, vol. 3479, Jan. 1, 2005, pp. 211-222, XP007909332 ISSN: 0302-9743.

(Continued)

*Primary Examiner* — Andrew Bee
(74) *Attorney, Agent, or Firm* — Waddey & Patterson, P.C.; James R. Cartiglia

(57) ABSTRACT

A method of producing location information relating to articles (e.g. $9_o$) utilizes tag devices ($1_0$, $1_1 1_2$, • • •)• The method comprises the steps of: • the tag devices (e.g. $I_0$), when in each other's proximity, exchanging identification data and storing the time and date of the exchange together with the identification data of the other tag device, and also storing data relating to previous exchanges, • the tag devices, when in the proximity of an information collection device (e.g. $2_o$), communicating the stored times and dates together with the stored identification data to an information collection device, • the information collection device ($2_0$) transmitting the times and dates and the identification data received from the tag devices to a central processing device (3), and • the central processing device (3) deriving location information from the times and dates and the identification data. Each tag device (e.g. $1_o$), during each encounter with another tag device (e.g. $1_1$), also exchanges and stores encounter data relating to previous encounters, such that the encounter data which each tag device communicates to an information collection device (e.g. $2_o$) may relate to encounters of a plurality of tag devices.

20 Claims, 5 Drawing Sheets

(56) References Cited

U.S. PATENT DOCUMENTS

Figure 1:
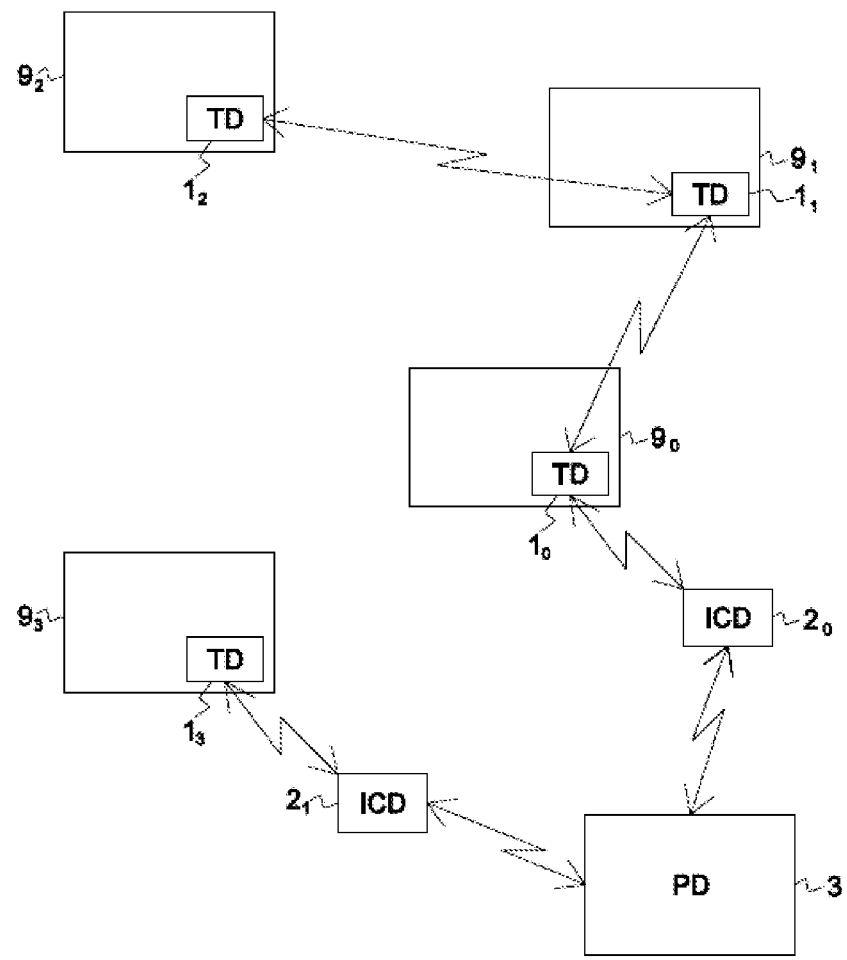

2005/0236479 A1    10/2005   Schmidtberg et al.
2007/0268138 A1*   11/2007   Chung et al. ............... 340/572.1
2008/0059127 A1    3/2008   Lee et al.
2010/0039228 A1*   2/2010   Sadr et al. .................... 340/10.1

OTHER PUBLICATIONS

PCT/NL2009/050679 International Search Report, mailed Feb. 2, 2010.

* cited by examiner

LOCATION INFORMATION BASED UPON ELECTRONIC TAGS

The present invention relates to producing location information using electronic tags. More in particular, the present invention relates to a method of producing location information relating to articles provided with tag devices. In addition, the present invention relates to a system and devices for carrying out this method.

It is well known to use electronic tags to trace a wide range of articles, such as clothes, foodstuff, consumer electronics, post items, containers and even cars. Passive electronic tags, also known as transponders, are used for example in shops and warehouses to keep inventory and to prevent theft. When an article carrying a (passive or active) tag passes a detection station (such as an RFID reader), the tag's identification is read and hence the location of the corresponding article is known, as these detection stations have known, typically fixed, locations. Tags may also be used to track articles being shipped by boat, airplane, truck or rail. By reading a tag's identification at certain fixed points, the progress of an article along its route may be monitored. In case the article is lost, its last known location may be determined, thus assisting in the recovery of the article.

U.S. Pat. No. 7,484,662 discloses a system for transmitting location event information to and from an electronic tag, such as an RFID (radio frequency identification) tag, from and to one or more location identification stations. When a tag is in the vicinity of such a station, it can communicate with the station and receive the station's identification. The tag may then store this identification in its memory, together with the time and/or date that the identification was received. In this manner, the tag can itself keep a record of the stations where it has been. The stations may be fixed, in which case they have a known location, making it possible to determine the location of the tag at the particular time and date by using the station identification. However, the stations may also be mobile and be accommodated in a plane or railway car, in which case their locations are not known. In the case of mobile stations, U.S. Pat. No. 7,484,662 suggests that the current "location" at which that station is disposed may be ascertained from a look-up table or the like, but leaves the reader in doubt as to the manner in which a look-up table may be used to determine the current position of a railway car. In other words, U.S. Pat. No. 7,484,662 fails to disclose a clear method for determining the position of a tag using the location identification information produced by mobile stations. In addition, the number of times a tag will encounter a station during a route will be limited, thus necessarily providing a limited amount of location information.

U.S. Pat. No. 5,959,568 discloses an electronic tag system in which tags may determine their relative locations by measuring the round-trip times of signals. Multiple symbols are transmitted from one object to another object and then returned, such that their round-trip times may be measured. Absolute locations are determined using GPS (Global Positioning System) apparatus. The tags may store identifications of their neighbours in order to form a network.

U.S. Pat. No. 7,234,421 discloses an animal data gathering device, in particular an animal tagging device which holds an animal's unique identifier and a record of the unique identifiers with which the animal has come into radio contact. Date information may be stored with the unique identifier. A reader can then be used to access the information. This known tagging device may further comprise GPS circuitry for providing information relating to the geographical location of the device.

The tags of U.S. Pat. Nos. 5,959,568 and 7,234,421 require GPS circuitry to determine (absolute) locations. However, GPS circuitry is relatively expensive, thus increasing the price of the tags. In addition, added GPS circuitry increases the power consumption of the tags, thus shortening their battery life.

It is an object of the present invention to overcome these and other problems of the Prior Art and to provide a method of and a system for producing location information which do neither depend on fixed identification stations having known locations, nor on GPS circuitry.

It is a further object of the present invention to provide a method of and a system for producing location information which produce an increased amount of location information, thus allowing a better tracking of articles.

Accordingly, the present invention provides a method of producing location information relating to articles provided with tag devices, each tag device comprising a memory unit for storing unique identification data associated with the respective tag device, a first communication unit for communicating with other tag devices when in their proximity, and a clock unit, the method comprising the steps of:

a tag device, during an encounter with another tag device, exchanging identification data and storing the time and date of the exchange together with the identification data as encounter data, a tag device, when in the proximity of an information collection device comprising a memory and a second communication unit, communicating the stored encounter data to the information collection device, the information collection device communicating the encounter data received from tag devices to a processing device, and the processing device deriving location information from the encounter data, characterised in that each tag device, during each encounter with another tag device, also exchanges and stores encounter data relating to previous encounters, such that the encounter data which each tag device communicates to an information collection device may relate to encounters of a plurality of tag devices.

By storing encounter data during an encounter, when tag devices are in each other's proximity, and not only when tag devices are in the proximity of identification stations, the number of encounters and hence the amount of data will be significantly increased, thus increasing the degree to which the location of the tag device can be known. By transferring the stored encounter data to a processing device via an information collection device, the transmission power of the tag units may be limited while still being able to transfer the encounter data to the processing device. By deriving location information from the encounter data, the desired location information is produced, even when the encounter data are based on tag devices encountering other tag devices, instead of tag devices encountering fixed stations.

By also exchanging and storing encounter data relating to previous encounters, which may have been with further tag devices not involved in the current encounter, such that the encounter data stored by each tag device relate to encounters of a plurality of tag devices, it is achieved that the amount of encounter data carried by each tag device is significantly increased. As a result, it has become easier to determine the location of the tag devices. In addition, the encounter data communicated to an information collection device by a single tag device may already be sufficient to produce the desired location information.

Although the tag devices may, during an encounter, exchange (that is, each send and receive) only part of the encounter data stored in their respective memories, it is preferred that they exchange all stored encounter data, thus optimising the exchange. In order to avoid unnecessary duplication of data and to save memory, it is further preferred that each tag device, during each encounter with another tag device, exchanges all stored encounter data but stores only any new encounter data. New encounter data may be selected for storing in memory by comparing any received encounter data with stored encounter data.

The first communication unit is preferably a short range communication unit while the second communication unit is preferably a long range communication unit. It will be understood that the terms short range communication unit and long range communication unit are meant to be relative. The short range communication units are suitable for exchanging information between tag devices, and between transponders and information collection devices, when these devices are within a relatively small distance from each other, for example less than two meters, or less than 30 cm. The long range communication units are suitable for exchanging information between information collection devices and a (central) processing unit over distances of several meters, several km, or even several dozens of km. As will be clear from these non-limiting examples, the "short" range and the "long" range may overlap.

The encounter data may comprise time data indicative of the point in time of the exchange, date data indicative of the date of the exchange, and identification data indicative of the identification of the tag devices involved in the exchange. When stored in a tag device, the encounter data need only include the identification data of other tag devices, as each tag device will store (possibly in another memory section) its own identification. When stored in an information collection device, the encounter data will comprise pairs of identification data, indicative of each pair of tag devices involved in the respective exchange.

Encounter data may not only be produced when a tag device encounters another tag device, but also during conventional encounters of a tag device and an information collection device.

The information collection devices, which serve as intermediaries between the tag devices and the processing device, may be stationary and have a fixed (and preferably known) location. Embodiments using fixed information collection devices have the advantage of being able to provide additional information: the fixed locations of the information collection devices, which may be used to produce additional encounter data involving tag devices and information collection devices. However, the information collection devices need not be fixed and may therefore also be mobile. Although mobile information collection devices are typically not capable of providing information regarding their exact location, they may have more frequent encounters with tag devices and may therefore collect information more often.

In a preferred embodiment, an information collection device is constituted by a dedicated tag device. That is, a particular tag device is adapted to also serve as an information collection device. In this embodiment, such a tag device has a dual function: it both collects information and transmits received information. It is noted that in principle, any tag device could serve as an information collection device, provided it is capable of communicating with a processing device.

In certain embodiments a information collection device transmits the encounter data in batches. That is, the information collection device collects the exchange information from several tag devices and only transmits this information when a certain condition is satisfied, for example when information from a predetermined number (for example 5, 10 or 20) of tag devices has been collected, when its memory is full, or when a certain time period has elapsed. Accordingly, the information collection device may delete the stored encounter data once they have been transferred to the processing device, thus clearing its memory. Similarly, tag devices may delete encounter data once they have been transferred to an information collection device.

In an advantageous embodiment of the method according to the present invention, the step of deriving location information comprises the following sub-steps:
  using identification data to select encounter data relating to a particular tag device,
  using the times and dates of exchanges involving the same tag device to produce a set of possible locations at those times and dates,
  using the same encounter data to identify the other tag devices involved in the exchanges represented by the encounter data, and
  using any known start positions of the same and other tag devices to reduce the set of possible locations and to produce a most probable location at the times and dates.

By selecting encounter data while using identification data, a set of data pertaining to the encounters of the tag device associated with the identification data can be produced. The encounter data will comprise dates, times and identification data of other tag devices. By using any known start position of the tag device and a start time, possible locations at the times and dates contained in the encounter data can be determined. Combining those possible locations with the possible locations of the other tag devices derived from the selected encounter data allows the most probable locations for the respective times and dates to be determined.

In an advantageous further embodiment, the most probable location is determined for the earliest first time and date and is then used to determine the most probable location for the next time and date. By using a consecutive approach, if possible starting from a known location, location estimates can be produced. However, the method may also produce location estimates if no start locations are known.

The step of deriving location information preferably involves Bayesian belief networks and inference methods for such a network. More in particular, a Bayesian belief network may be defined and may be updated using the encounter data. In other words, the step of deriving location information preferably comprises the sub-steps of:
  defining, for each tag device and each point in time, variables which represent the probabilities of the particular tag device being at a certain location at the particular point in time, and
  updating said variables by using encounter data.

By using a Bayesian belief network and by using encounter data to update this network, increasingly accurate location estimates are obtained. The updating step is preferably repeated.

The present invention also provides a computer program product for carrying out the method as defined above, in particular, but not exclusively, the step of deriving location information from the encounter data. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention additionally provides a system for producing location information relating to articles, the system comprising:
tag devices comprising a memory unit for storing unique identification data associated with the respective tag device, a first communication unit for communicating with other tag devices, and a clock unit,
at least one information collection device comprising a memory and a second communication unit, and
a processing device comprising a memory unit and a processing unit for processing encounter data received from the tag devices and for deriving location data from the encounter data,
wherein the at least one information collection device is arranged for communicating the encounter data received from the tag devices to the processing device,
characterised in that each tag device is arranged for additionally exchanging and storing, during each encounter with another tag device, encounter data relating to previous encounters, such that the encounter data which each tag device communicates to an information collection device may relate to encounters of a plurality of tag devices.

The processing device of the system is preferably arranged for using a Bayesian belief network and deriving location information by:
defining, for each tag device and each point in time variables which represent the probabilities of the particular tag device being at a certain location at the particular point in time, and
updating said variables by using encounter data.

The present invention further provides a tag device for use in the method and/or the system as defined above, the tag device comprising:
a memory unit for storing identification data associated with the tag device,
a communication unit for communicating with other tag devices, and
a clock unit,
the tag device being arranged for, when in the proximity of an information collection device, communicating the stored encounter data to the information collection device,
characterised by being arranged for additionally exchanging and storing, during each encounter with another tag device, encounter data relating to previous encounters, such that the encounter data which each tag device communicates to an information collection device may relate to encounters of a plurality of tag devices.

The present invention still further provides an information collection device for use in the method and/or the system defined above, the information collection device comprising a memory and a communication unit and being arranged for receiving and storing encounter data and communicating the stored encounter data to a processing device. As noted above, an information collection device according to the present invention may also have all features of a tag device.

The present invention yet further provides a processing device for use in the method and/or the system defined above, the processing device comprising a memory unit and a processing unit, and being arranged for processing encounter data received from tag devices and for deriving location data from the encounter data as in the method defined above.

The present invention will further be explained below with reference to exemplary embodiments illustrated in the accompanying drawings, in which:

FIG. 1 schematically shows a location information system according to the present invention.

Figure 2:
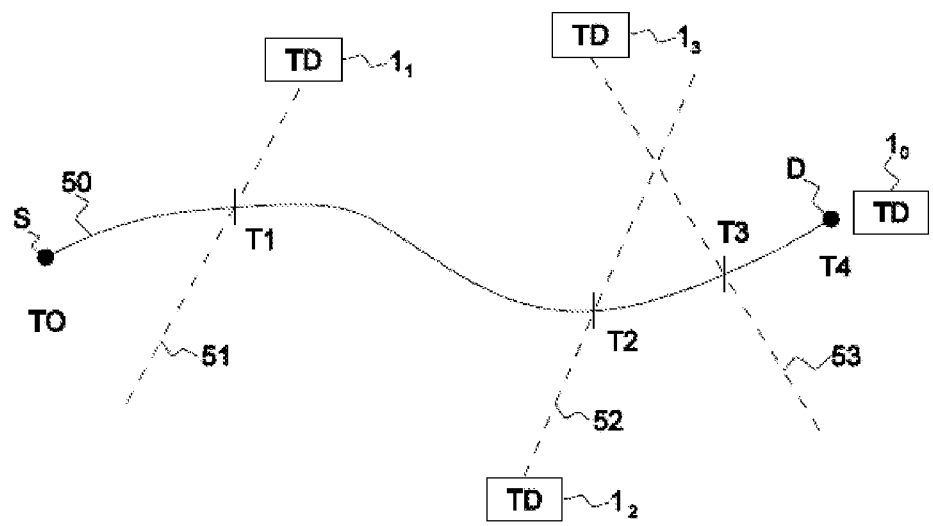

FIG. 2 schematically shows the route of an electronic tag device according to the present invention.

Figures 3A, 3B:
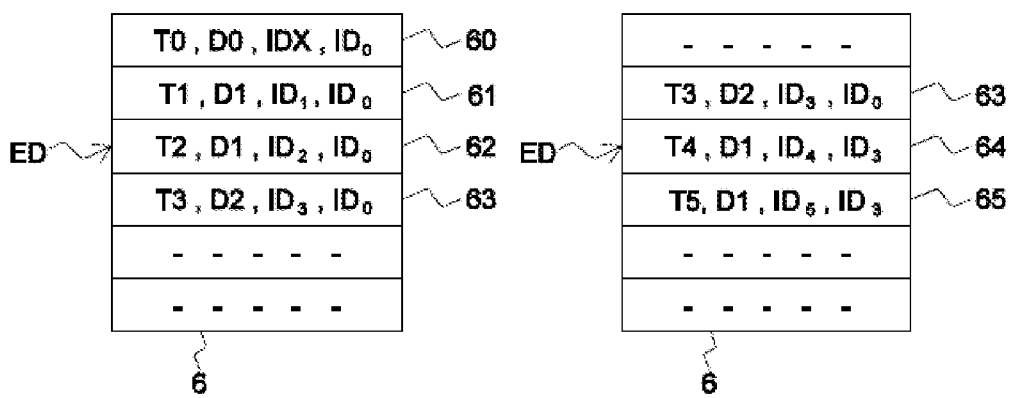

FIGS. 3A & 3B schematically show exemplary embodiments of a set of encounter data according to the present invention.

Figure 4:
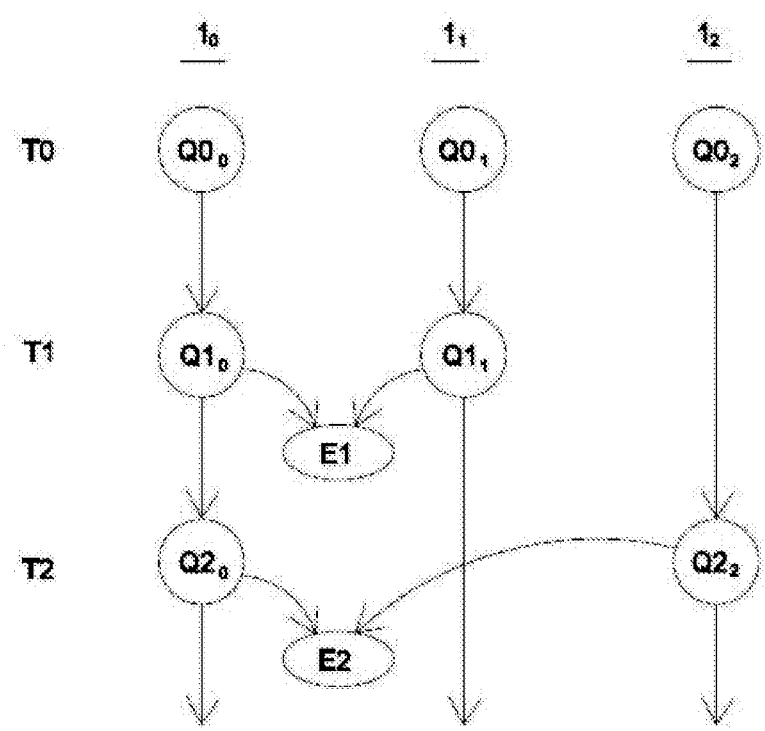

FIG. 4 schematically shows an example of a Bayesian belief network as may be used in the present invention.

Figure 5:
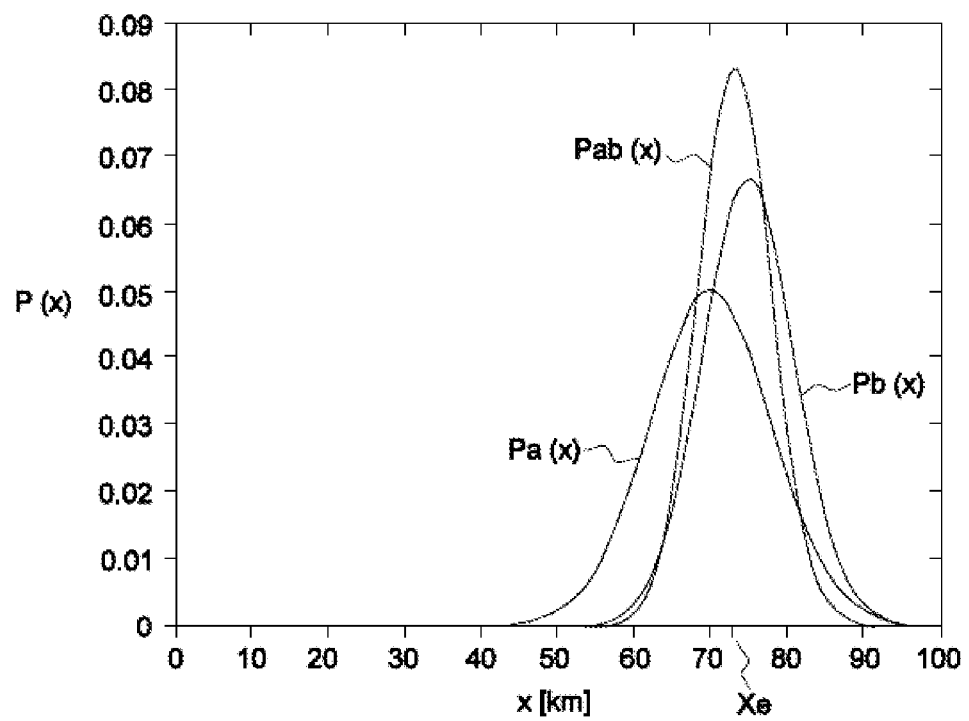

FIG. 5 schematically shows examples of location probability distributions according to the present invention.

Figure 6:
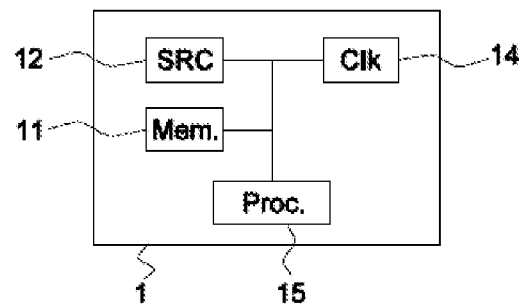

FIG. 6 schematically shows an exemplary embodiment of a tag device according to the present invention.

Figure 7:
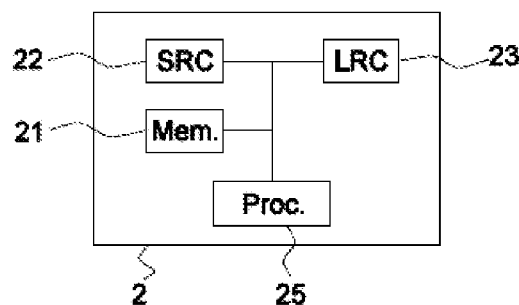

FIG. 7 schematically shows an exemplary embodiment of an information collection device according to the present invention.

Figure 8:
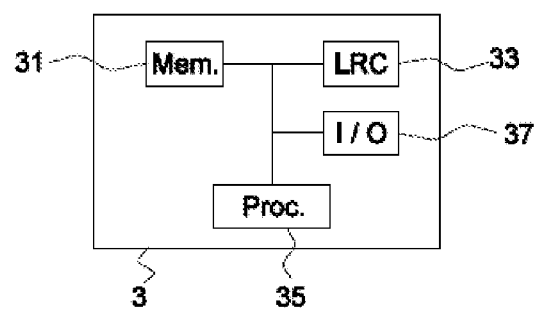

FIG. 8 schematically shows an exemplary embodiment of a processing device according to the present invention.

The location information system shown merely by way of non-limiting example in FIG. 1 comprises tag devices (TD) $1_0, 1_1, \ldots$, information collection devices (ICD) $2_0$ and $2_1$, and a processing device (PD) 3. As will be explained in more detail below, the tag devices $1_i$ (where i=0, 1, 2, . . . ), which may be attached to articles $9_i$, such as parcels, clothing items, machine parts or vehicles, exchange data when they are in each other's proximity. The distance at which the tag devices exchange data will depend on the particular embodiment and may range from a few milli meters to a few meters or more. During each encounter of articles $9_i$ provided with tag devices $1_i$ the tag devices exchange identification data and also register the time and date of the encounter (that is, of the exchange). The data involved in this exchange therefore typically comprise identification data, time data and date data, and may collectively be referred to as encounter data. These encounter data may further comprise additional data, such as sensor data, video data and other data which, however, are not essential to the present invention.

The tag devices $1_0, 1_1, \ldots$ store and thus collect the encounter data of the encounters with other tag devices. In accordance with the present invention, the tag devices additionally exchange and store, during each encounter, the available encounter data of any previous encounters that the tag devices may have stored. Thus each tag device stores not only the encounter data relating to its own encounters, but also the encounter data previously collected by the tag devices it encountered. It can thus be seen that a tag device of the present invention stores two types of encounter data: direct encounter data which relate to encounters in which the particular tag device was involved, and indirect encounter data which relate to encounters in which the particular tag device was not involved, but which encounter data were received through other tag devices. In other words, in the present invention the tag devices also collect encounter data of encounters in which they were not involved, thus collecting encounter data of tag devices they may have never encountered.

It is preferred that a tag device, during an encounter, only stores any new encounter data, thus avoiding duplication and saving memory space. Any exchanged encounter data are therefore preferably compared with the memory contents of the tag device, and only new encounter data are added to the memory contents.

When a tag device (e.g. $1_0$) comes within the proximity of an information collection device (e.g. $2_0$), the former sends all the stored encounter data to the latter. The tag device may then (optionally) erase the sent encounter data from its memory. The information collection device 2 collects the encounter data from one or more tag devices and sends the encounter data to the processing device 3. Although it is preferred to collect and send the encounter data from several tag devices in a single transmission (batch), it is also possible to forward the encounter data of each tag device separately, before receiving encounter data from another tag device.

One or more information collection devices 2 forward the encounter data to the processing device 3, which is arranged for processing the encounter data so as to produce location data, as will be described in more detail later.

A route 50 of a tag device 1 is schematically illustrated in FIG. 2. At point in time T0 and date D0, an article and its associated tag device $1_0$ having an identification $ID_0$ are at start location S. In the present example, this start location S is a known location bearing an identification (IDX in FIG. 3A). However, this is not essential and it is sufficient that a set of possible start locations of the tag device $1_0$ is provided, with a known probability of every possible start location.

It is noted that the time and date may collectively be referred to as time (e.g. T0). In the present example, however, the time data and date data are indicated separately as, for example, T0 and D0.

At time T1 (and date D1), the article and its tag device $1_0$ encounter another article carrying a tag device $1_1$ which has an identification $ID_1$. This other article (e.g. $9_1$ in FIG. 1) follows a route 51 which intersects the route 50 of the tag device $1_0$. At point in time T1, the tag devices $1_0$ and $1_1$ exchange their identification data $ID_0$ and $ID_1$. The tag device $1_0$ then stores, in its memory, its encounter data which consist of the identification $ID_1$ of the other tag device $1_1$, the time T1 and the date D1 of the exchange, and preferably also its own identification $ID_0$. The other tag device $1_1$ will in turn store, in its memory, its encounter data which include T1 and D1 as well as the identification $ID_0$ of tag device $1_0$, and preferably also its own identification $ID_1$. It can thus be seen that the encounter data produced during an encounter are typically the same for both tag devices. However, according to an important aspect of the present invention, encounter data of previous encounters are also exchanged during an encounter, as will be later explained in more detail.

FIG. 3A illustrates, by way of non-limiting example, a table of encounter data (ED) produced by the tag device $1_0$ while moving along its route 50. Each entry consists of the time, the date, the identification of the entity (tag device or other device) encountered and the tag device's own identification. Entry 61, for example, contains the data items T1, D1, $ID_1$ and $ID_0$ and pertains to the first encounter of tag device $1_0$. The first entry 60, produced at T0 and D0, includes in the present example the identification IDX of a fixed station at the start location S.

At time T2, the route 50 of the tag device $1_0$ crosses the route 52 of the further tag device $1_2$. As a result, the tag device $1_0$ stores the identification $ID_2$ (represented by corresponding identification data), the time T2 and the date D1 (assuming this happens on the same date as the first encounter), together with its own identification $ID_0$, as encounter data (entry 62 in FIG. 3A). Similarly, at time T3 and date D2 the route 50 crosses the route 53 of tag device $1_3$ resulting in corresponding encounter data (entry 63 in FIG. 3A). In the present example, the tag device $1_0$ reaches its destination D at T4.

The encounter data produced are stored in the memory of the tag device 1, as illustrated in FIG. 3A. As explained above, the merely exemplary table 6 comprises a number of entries 60, 61, 62, . . . corresponding with the encounters and exchanges at the points in time T0, T1, T2, . . . respectively. Each entry consists of a set of encounter data (ED) of one encounter. The entry 61, for example, comprises the data T1,
D1 and $ID_1$ and $ID_0$ of the first encounter. The entry 60 is shown to comprise encounter data corresponding to the start location (S in FIG. 2): the start time T0, the start date D0, and the identification IDX of an identification station used to determine the start location.

According to the present invention, the tag devices not only exchange and store identifications, but also encounter data. That is, during each encounter a tag device receives from the other device the (direct and indirect) encounter data of all the other device's previous encounters. Referring to FIG. 2, at T3 tag device $1_0$ sends the encounter data stored thus far (entries 60, 61 and 62 in FIG. 3A) to tag device $1_3$. During the same encounter, tag device $1_0$ receives from tag device $1_3$ its stored the encounter data, for example relating to encounters with tag device $1_4$ at T4 and with tag device $1_5$ at T5. These received encounter data are stored in the memory of tag device $1_0$, together with the encounter data produced during the current encounter, resulting in an augmented set 6. This is illustrated in FIG. 3B, where the entries 64 and 65 are received from tag device $1_3$. In this way, the amount of encounter data collected by each tag device is significantly increased.

It can also be seen that the tag devices act as a means of communication: they are capable of carrying and thus transporting data, in the present case encounter data, by way of relatively short-range transmissions and physical movements. The present invention can therefore also be said to provide an information transmission system using tag devices. Information can be transported from any tag device or location to any other tag device or location using the short range communication capabilities and the physical movement of the tag devices.

The encounter data ED stored in the table 6, combined with the encounter data of similar tables compiled in other tag devices, are used to determine the location of the tag device $1_0$ at various points in time. On the route 50 of FIG. 2, the location of the tag device is only known with certainty at T0. However, the present invention allows the location of the tag device to be determined with a reasonable degree of accuracy at all other points of the route.

Using the time differences between T0 and T1, T2 and T1, etc., an estimate can be made of the possible locations of the tag device $1_0$ along the route 50, using a priori data such as expected speed, expected stops, trajectory, and possibly other data. According to the present invention, these estimates are preferably expressed as probabilities, as illustrated in FIG. 5, which may be calculated using a Bayesian belief network, as schematically illustrated in FIG. 4, and inference methods for such networks.

Referring to the example of FIG. 5, it can be inferred from the known route 50, the probability distribution of the (average) speed, and the set of encounter data (entry 61 in FIG. 3A) corresponding to the first encounter at T1 that the probability distribution of the location of tag device $1_0$ at T1 is centred around 70 km from the start position S. That is, in the present example the most probable distance from the starting point S at time T1 is 70 km, the probability being distributed as shown by curve Pa(x), where x is the distance in km from the starting point S. In the present example, the probabilities have Gaussian distributions.

Using similar data of tag device $1_1$, it can be inferred that the probability distribution of the location of tag device $1_1$ at time T1 is centred around 75 km from its starting position on route 51, as illustrated by the curve Pb(x). As the tag devices $1_0$ and $1_1$ had an encounter at time T1 and therefore were at the same location at T1, it can be inferred that the location of the tag devices at T1, at the point of intersection of routes 50 and $51$, is approximately 73 km from the starting point S, as given by the probability distribution Pab(x).

In a similar manner, the most probable locations at T2 and T3 can be determined By using previous results (for example the most probable location at T1) to determine further locations (for example at T2, T3, . . . ), the accuracy of the estimates is improved.

The inference referred to above is preferably, but not necessarily, carried out using a Bayesian belief network and inference methods for such networks. Part of a merely exemplary Bayesian belief network is schematically illustrated in FIG. 4. It is noted that Bayesian belief networks are well known per se.

The partial Bayesian belief network of FIG. 4 consists of variables Q, each of which represents the location of a tag at a particular point in time, such as the time of an encounter. Each variable comprises a set of numbers, each representing the probability that a tag device is at a specific location, as will be explained later.

In FIG. 4 the variables of three tag devices $1_0$, $1_1$ and $1_2$ are shown at three points in time T0, T1 and T2, corresponding with the tag devices and points in time in FIG. 2. At T0, a variable $Q0_0$ describes the tag device $1_0$. At T1, a variable $Q1_0$ describes a state in which tag device $1_0$ encounters tag device $1_1$, which in turn has an associated variable $Q1_1$. The encounter itself results in an evidence variable E1. An evidence variable typically consists of two numbers, each number representing the probability of two possible evidence values (TRUE or FALSE, representing an encounter and no encounter respectively). Since an encounter occurred at T1, the probability of an encounter is equal to 1 while the probability of no encounter is equal to 0.

Similarly, the encounter between tag devices $1_0$ and $1_2$ at T2 results in an evidence variable E2. It will be clear that the tag devices will have further states at later points in time.

As mentioned above, each variable in the Bayesian belief network represents a set of probabilities, each probability corresponding with a location at a particular point in time. The variable $Q0_0$ of tag device $1_0$, for example, may be represented as follows:

| ... | ... | ... | ... | ... | ... |
|---|---|---|---|---|---|
| P(x0, y4) | P(x1, y4) | P(x2, y4) | P(x3, y4) | P(x4, y4) | ... |
| P(x0, y3) | P(x1, y3) | P(x2, y3) | P(x3, y3) | P(x4, y3) | ... |
| P(x0, y2) | P(x1, y2) | P(x2, y2) | P(x3, y2) | P(x4, y2) | ... |
| P(x0, y1) | P(x1, y1) | P(x2, y1) | P(x3, y1) | P(x4, y1) | ... |
| P(x0, y0) | P(x1, y0) | P(x2, y0) | P(x3, y0) | P(x4, y0) | ... |

In this table, each entry represents the probability that the particular tag device (in this case tag device $1_0$) is at position (xi, yi), where xi and yi may be coordinates on a map. The sum of all entries of the table is equal to 1, as it is certain (in the present example) that the tag device $1_0$ is somewhere on the map. The table is based upon prior assumptions, each entry reflecting a belief about the position of the tag device.

Similarly, a table may be drawn up for transitions between variables and their probabilities. The transitions are illustrated in FIG. 4 by arrows, and a so-called conditional probability table (CPT) may describe the transitions in term of probabilities: each element of a CPT is the probability that a tag will be at a specific future location given that the tag is at a specific present location. One particular probability in the CPT associated with the transition (arrow in FIG. 4) between variables $Q0_0$ and $Q1_0$ may, for example, be P(x4, y3|x2, y2), which represents the probability of the tag device $1_0$ being at location (x4, y3) at T1 given that it was at location (x2, y2) at T0. These conditional probabilities are also based upon prior assumptions, that is beliefs, at least initially.

The beliefs are propagated from one variable to the next (e.g. from $Q0_0$ to $Q1_0$ in FIG. 4) as foreground information π: the next variable (e.g. $Q1_0$) is based upon the present variable (e.g. $Q0_0$). Each encounter produces evidence λ which is propagated backwards (e.g. from variable E1 to variables $Q1_0$ and $Q1_1$) to also update the probability tables. In this way, the evidence E1 indirectly influences the state of (future) variable $Q2_0$ and, via (future) evidence E2, (future) variable $Q2_2$.

It can thus be seen that the information (that is, encounter data) produced and exchanged during encounters is propagated through the Bayesian belief network to update the probability tables. Even though the tables are originally based upon assumptions, they are gradually converted into tables reflecting probabilities based upon encounter data. That is, the accuracy of the tables increases with the number of encounters. It can thus be seen that encounter data are used to produce increasingly accurate estimates of the positions of the tag devices at various points in time.

A merely exemplary embodiment of a tag device according to the present invention is schematically illustrated in FIG. 6. The tag device 1 of FIG. 6 comprises a memory (Mem) unit 11, a short range communication (SRC) unit 12, a clock (Clk) unit 14, and a processing (Proc) unit 15. Optionally, the tag device 1 may comprise a proximity detection unit (not shown).

The memory unit 11 is capable of storing encounter data, for example the encounter data ED illustrated in FIG. 3B. The memory unit 11 also (permanently or semi-permanently) stores the identification of the tag unit. In addition, the memory unit 11 may store suitable program code (software) for carrying out the exchange. The clock unit 14 provides the time and the date of the exchange. The processing unit 15 is capable of executing the program code and thus controlling out the exchange. The short range communication unit 12 serves to communicate with other tag devices.

In some embodiments, the tag device 1 may comprise a proximity detection unit (not shown) for detecting the proximity of another tag device or of an information collection device. In other embodiments, the proximity detection is carried out by the short range communication unit 12 in conjunction with the processing unit 15.

The tag device 1 is preferably small and rugged so as to be capable of being placed on or in various articles, such as boxes, envelopes, clothing items, plastic crates, mobile telephones, computers, cars, etc.

A merely exemplary embodiment of a information collection device according to the present invention is schematically illustrated in FIG. 7. The information collection device 2 of FIG. 7 comprises a memory (Mem) unit 21, a short range communication (SRC) unit 22, a long range communication (LRC) unit 23, and a processing (Proc) unit 25. The short range communication unit 22 serves to communicate with tag devices, while the long range communication unit 23 serves to communicate with a processing device. It is noted that the terms "short range" and "long range" are not meant to define mutually exclusive communication ranges: the "short range" and the "long range" may in some embodiments overlap. However, the "short range" communication between tag devices will in most embodiment take place within a range of less than 1 meter, while the "long range" communication between an information collection device and a processing device may involve a range of several meters, or even hundreds of meters or kilometers.

The information collection device 2 may be constituted by a dedicated tag device. That is, the information collection device may be a tag device provided with additional components (such as a long range communication unit 23) and program instructions (information collection and transfer software). In this way, the information collection device also produces encounter data.

A merely exemplary embodiment of a processing device according to the present invention is schematically illustrated in FIG. 8. The processing device 3 of FIG. 8 comprises a memory (Mem) unit 31, a long range communication (LRC) unit 33, a processing (Proc) unit 35 and an input/output (I/O) unit 37. The memory unit 31 serves to store suitable program instructions (software), as well as the encounter data received from the information collection devices, any location data derived from the encounter data, and any additional information, such as (street) maps and/or vehicle specifications. The long range communication unit 33 serves to communicate with and receive encounter data from information collection devices. The input/output unit 37 serves to receive suitable instructions and to output location data.

It is noted that in some embodiments, the information collection devices may be omitted. In such embodiments, the tag devices communicate directly with the processing device, preferably using suitable long range communication units.

In some embodiments, the processing device 3 may be constituted by a suitably programmed general purpose computer provided with communication facilities, such as the long range communication unit. Although the long range communication units referred to above are preferably wireless electromagnetic units using, for example, RF (radio frequency) radiation, other embodiments are also possible such as IR (infra-red) communication or communication via a cable or a physical carrier, such as a USB stick. Wireless communication may include radio communication and/or satellite communication.

In the system of the present invention, the memories of the tag devices serve as a pooled memory for storing encounter data: they each store the encounter data relating to a number of encounters involving other tag devices.

The present invention is particularly useful in tracking and tracing applications, for example, but not limited to, tracking and tracing post items, shipments, crates, pallets, parts in factories, vehicles, files in offices, but also cattle, dogs, children, and other living things. The present invention may also be used for tracking visitors in amusement parks or during conferences, and is particularly useful for determining which visitors met each other.

The present invention is based upon the insight that an encounter of two items, such as tag devices, produces useful information which can be used to determine the position of the encounter. The present invention benefits from the further insight that the tag devices can be used to transport information, in particular by exchanging memory contents during an encounter.

Accordingly, the present invention uses three inventive concepts: (1) tags exchange information to collect data regarding encounters; (2) information collection devices collect information from the tag devices and pass this information on to processing devices, and (3) the encounter data are used to derive location information.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents. It is further noted that the word "data" is grammatically plural, in the same way that "cars" and "children" are grammatically plural, however, the word "data" may refer to one or more data items.

It will be understood by those skilled in the art that the present invention is not limited to the embodiments illustrated above and that many modifications and additions may be made without departing from the scope of the invention as defined in the appending claims.

The invention claimed is:

1. A method of producing location information relating to articles provided with tag devices each tag device comprising a memory unit for storing unique identification data associated with the respective tag device, a first communication unit for communicating with other tag devices when in the proximity of the other tag devices, and a clock unit, the method comprising the steps of:
   each tag device during an encounter with another tag device, exchanging identification data and storing the time and date of the exchange together with the identification data as encounter data,
   each tag device, when in the proximity of an information collection device comprising a memory and a second communication unit, communicating the stored encounter data to the information collection device,
   the information collection device communicating the encounter data received from tag devices to a processing device, and
   the processing device deriving location information from the encounter data,
   wherein each tag device, during each encounter with another tag device, also exchanges and stores encounter data relating to previous encounters, such that the encounter data which each tag device communicates to the information collection may relate to encounters of a plurality of tag devices.

2. The method according to claim 1, wherein each tag device, during each encounter with another tag device exchanges all stored encounter data but stores only any new encounter data.

3. The method according to claim 1, wherein the information collection device is constituted by a fixed station.

4. The method according to claim 1, wherein the information collection device is constituted by a dedicated tag device.

5. The method according to claim 1, wherein the information collection device transmits the encounter data in batches.

6. The method according to claim 1, wherein a tag device deletes stored encounter data once the stored encounter data has been communicated to the information collection device.

7. The method according to claim 1, wherein the information collection device deletes stored encounter data once the stored encounter data has been communicated to the processing device.

8. The method according to claim 1, wherein the step of deriving location information comprises the following substeps:
   using identification data to select encounter data relating to a particular tag device,
   using the times and dates of exchanges involving the same tag device to produce a set of possible locations at those times and dates,
   using the same encounter data to identify the other tag devices involved in the exchanges represented by the encounter data, and
   using any known start positions of the same and other tag devices to reduce the set of possible locations and to produce a most probable location at the times and dates.

9. The method according to claim 8, wherein the most probable location is determined for an earliest first time and date and is then used to determine a most probable location for a next time and date.

10. The method according to claim 1, wherein the step of deriving location information involves a Bayesian belief network.

11. The method according to claim 10, wherein the step of deriving location information comprises the sub-steps of:
defining, for each tag device and time, variables which represent the probabilities of a particular tag device being at a certain location at a particular point in time, and
updating said variables by using encounter data.

12. A computer program product comprising a non-transitory computer readable medium executing a computer program for carrying out the method according to claim 1.

13. A system for producing location information relating to articles, the system comprising:
tag devices, each tag device comprising a memory unit for storing unique identification data associated with the respective tag device, a first communication unit for communicating with other tag devices, and a clock unit,
at least one information collection device comprising a memory and a second communication unit,
each tag device, during an encounter with another tag device, exchanging identification data and storing the time and date of the exchange together with the identification data as encounter data, and communicating the stored encounter data to the at least one information collection device, and
a processing device comprising a memory unit and a processing unit for processing encounter data received from the tag devices and for deriving location data from the encounter data,
wherein the at least one information collection device is arranged for communicating the encounter data received from the tag devices to the processing device,
wherein each tag device is arranged for additionally exchanging and storing, during each encounter with another tag device, encounter data relating to previous encounters, such that the encounter data which each tag device communicates to the at least one information collection device may relate to encounters of a plurality of tag devices.

14. The system according to claim 13, wherein each tag device, during each encounter with another tag device, exchanges all stored encounter data but stores only any new encounter data.

15. The system according to claim 13, wherein the at least one information collection device is constituted by a fixed station.

16. The system according to claim 13, wherein the at least one information collection device is constituted by a dedicated tag device.

17. The system according to claim 13, wherein the processing device is arranged for:
using identification data to select encounter data relating to a particular tag device,
using the times and dates of exchanges involving the same tag device to produce a set of possible locations at those times and dates,
using the same encounter data to identify the other tag devices involved in the exchanges represented by the encounter data, and
using any known start positions of the same and other tag devices to reduce the set of possible locations and to produce a most probable location at the times and dates.

18. The system according to claim 13, wherein the deriving location information involves a Bayesian belief network.

19. The system according to claim 18, wherein the processing device is arranged for:
defining, for each tag device and time, variables which represent the probabilities of a particular tag device being at a certain location at a particular point in time, and
updating said variables by using encounter data.

20. A tag device for use in a method of producing location information relating to articles provided with tag devices, wherein each of the tag devices stores unique identification data, the tag device comprising:
a memory unit for storing the unique identification data associated with the tag device,
a communication unit for communicating with other tag devices when the tag device is in the proximity of the other tag devices, and
a clock unit,
the tag device being arranged for, during an encounter with another tag device, exchanging identification data and storing the time and data of the exchange together with the identification data as encounter data and, when in the proximity of an information collection device, communicating the stored encounter data to the information collection device such that location information can be derived from the encounter data,
wherein the tag device is arranged for additionally exchanging and storing, during each encounter with another tag device, encounter data relating to previous encounters, such that the encounter data which each tag device communicates to the information collection device may relate to encounters of a plurality of tag devices.

* * * * *